United States Patent
Brunet et al.

(10) Patent No.: US 6,654,759 B1
(45) Date of Patent: Nov. 25, 2003

(54) METHOD FOR ACCESS VIA VARIOUS PROTOCOLS TO OBJECTS IN A TREE REPRESENTING AT LEAST ONE SYSTEM RESOURCE

(75) Inventors: Alain Brunet, Boulogne Billancourt (FR); Philippe Marin, Le Pecq (FR); Alain Grignac, Le Chesnay (FR)

(73) Assignee: Bull S.A., Les Clayes-sous-Bois (FR)

( * ) Notice: Subject to any disclaimer, the term of this patent is extended or adjusted under 35 U.S.C. 154(b) by 338 days.

(21) Appl. No.: 09/721,757

(22) Filed: Nov. 27, 2000

(30) Foreign Application Priority Data

Nov. 26, 1999 (FR) .......................................... 99 14880

(51) Int. Cl.$^7$ .................................................. G06F 7/00
(52) U.S. Cl. ............................ 707/101; 707/3; 709/223
(58) Field of Search ................................. 707/100, 101, 707/4, 10; 709/223, 224, 225, 226, 316, 317

(56) References Cited

U.S. PATENT DOCUMENTS

| | | | | |
|---|---|---|---|---|
| 5,452,433 A | * | 9/1995 | Nihart et al. ............... 709/223 |
| 5,509,123 A | * | 4/1996 | Dobbins et al. ............ 709/243 |
| 5,704,041 A | * | 12/1997 | Allen et al. ................. 709/316 |
| 5,819,044 A | * | 10/1998 | Kawabe et al. ............. 709/226 |
| 5,913,037 A | * | 6/1999 | Spofford et al. ............ 709/226 |
| 6,052,724 A | * | 4/2000 | Willie et al. ................ 709/223 |
| 6,061,721 A | * | 5/2000 | Ismael et al. ............... 709/223 |
| 6,085,188 A | * | 7/2000 | Bachmann et al. ............. 707/3 |
| 6,119,122 A | * | 9/2000 | Bunnell ....................... 707/102 |
| 6,170,009 B1 | * | 1/2001 | Mandal et al. .............. 709/223 |
| 6,275,853 B1 | * | 8/2001 | Beser et al. ................ 709/223 |
| 6,282,568 B1 | * | 8/2001 | Sondur et al. .............. 709/223 |
| 6,349,333 B1 | * | 2/2002 | Panikatt et al. ............ 709/223 |
| 6,360,258 B1 | * | 3/2002 | LeBlanc ..................... 709/223 |
| 6,401,117 B1 | * | 6/2002 | Narad et al. ................ 709/223 |
| 6,405,251 B1 | * | 6/2002 | Bullard et al. ............. 709/224 |
| 6,427,153 B2 | * | 7/2002 | Nelson et al. ........... 707/103 R |
| 6,466,974 B1 | * | 10/2002 | Nelson et al. .............. 709/223 |
| 6,484,160 B1 | * | 11/2002 | Richard et al. ................ 707/2 |
| 6,553,368 B2 | * | 4/2003 | Martin et al. .................. 707/3 |
| 6,564,370 B1 | * | 5/2003 | Hunt .......................... 717/122 |
| 2002/0147696 A1 | * | 10/2002 | Acker et al. .................. 707/1 |

OTHER PUBLICATIONS

"Java Naming and Directory Interface Application Programming Interface (JNDI API)" "In Line!", Jul. 14, 1999, SUN MICROSYSTEMS XP002145962, Extract from the Internet: URL: ftp://ftp.javasoft.com/docs/j2se1.3/jndi.pdf—extract of Aug. 25, 200. P. 1, par. 1–p. 1, par. 6; p. 5, par. 1–p. 8, par. 8; Fig. 2; p. 24, par. 1–p. 25, par. 8.

(List continued on next page.)

Primary Examiner—Kim Vu
Assistant Examiner—Monplaisir Hamilton
(74) Attorney, Agent, or Firm—Edward J. Kondracki; James T. Carmichael; Miles & Stockbridge P.C.

(57) ABSTRACT

The method comprises at least one cycle comprising the following steps: creating a request (87) designating a target object (81) to be accessed in the tree (80) representing system resources and having a scope of only one level below the target object, using an access protocol attribute of the target object (81) indicating its access protocol (Pc) to allow access to the target object, and obtaining via the request a response that includes at least the naming attribute of each object (82, 83) contained in the scope of the request, and if at least one object contained in the scope of the request has an access protocol different from that of the target object, the access protocol attribute of this object.

23 Claims, 3 Drawing Sheets

OTHER PUBLICATIONS

Subrata Mazumdar: "Directory Enabled Management Information Base—Integration of MIB with Directories using COSNamingand JNDI" "In LIne" 9th IfIP/IEEE Int"L Workshop on Distributed Systems, Newark, DE XP002145963, Extract from the Internet: URL: http://www.bell–labs.com/user/mazum/papers/INCM/DEM _Paper.pdf, extract of Aug. 25, 2000 p.9, par. 3–p. 12, par. 2; figs. 3–5.

Dittrich A et al: "Integration of A TMN–Based Management Platform Into A COBA–Based Environment" IEEE Network Operations and Management Symposium (NOMS) US, New YOR, IEEE, vol. Symp. 5, Apr. 15, 1996, pp. 75–85, XP000641080, ISBN: 0–7803–2519–2, p. 80, par. 1–p. 81, par. 3.

Jae–Oh Lee: "TMN–based Q–adapation using Java Technology" Seamless Interconnection for Universal Services, Global Telecom. Conf. Globecom'99 (CAT. No. 99Ch37042; Reio de Janeiro, Brazil pp. 802–806, vol. 1b, XP002145961, 1999 , Piscataway, NJ, USA IEEE, ISBN: 0–7803–5796–5; p. 802, lefthand column, par. 1–p. 802, righthand column, par. 3.

* cited by examiner

METHOD FOR ACCESS VIA VARIOUS PROTOCOLS TO OBJECTS IN A TREE REPRESENTING AT LEAST ONE SYSTEM RESOURCE

RELATED APPLICATIONS

The subject matter of this application is related to application Ser. No. 09/721,761, filed Nov. 27, 2000, in the name of Bruno FARCY, entitled "Method for Communicating Via Several Protocols Between an Application and a System Resource". The subject matter of said related application is hereby incorporated by reference.

TECHNICAL FIELD

The subject of the invention is a method for access, via various protocols, to objects in a tree representing at least one system resource. The objects in the tree may be distributed and/or non-distributed. A related subject of the invention is the system that includes at least the resource or set of resources and that implements the method of the invention. Consequently, this system can range from a single resource to a set of resources that can be distributed in several systems, which may or may not be different. The system that will be used as an example is a computer system. The method of the invention is usable for navigating through any tree. By way of example, it will hereinafter be applied to the management of at least one resource, such as a machine, a network or an application, of the computer system. Hence, a related subject of the invention is the resulting management system.

The invention can be adapted to conventional protocols as well as to protocols more specifically designed for interconnected high-density wide-area networks, such as the internet networks of the Web.

DESCRIPTION OF RELATED ART

The management of computer resources is ordinarily handled by a management platform, several types of which are known. The platform that will be used as an example herein is that known by the registered trademark OpenMaster, marketed by applicants' assignee. This platform is based on object-oriented technology. In this technology, the means constituting a computer resource are converted into object classes organized hierarchically in a tree constituting a management information base MIB.

The platform used herein as a non-limiting example uses the standardized communication protocol dedicated to management, known as CMIP (Common Management Information Protocol). The CMIP protocol is based on the ISO standard defining services for transferring management information, called CMIS (Common Management Information Services). This protocol is organized using a management information description language called GDMO/ASN.1 issued by Guidelines for the Definition of Managed Objects, based on the interconnection module known by the registered trademark OSI (Open Systems Interconnection) of the ISO (International Standards Organization), and on the syntax ASN 1 (Application Syntax Notation One). For the sake of convenience, this language will simply be called GDMO.

The platform comprises management applications, for example adapted to the detection of objects in the base MIB, and to the monitoring and security of objects. These applications are under a user's control, and the objects they manage are accessed by sending requests and receiving responses. The requests and responses are sent to the target objects by a CMIP request broker of the platform. However, most of the target objects can only be reached through agents using a transmission protocol other than CMIP, which may or may not be standardized. Among the other known protocols that have been standardized by the ISO are the protocols SNMP (System Network Management Protocol), based on TCP/IP (Transmission Control Protocol/Internet Protocol) transmission, and DSAC (Distributed Systems Administration and Control) for an architecture like the Applicant's DSA (Distributed System Architecture). The transmission of the requests and responses takes place through an interface called an agent integrator, which performs the conversion between the platform's CMIP protocol and the other protocol.

However, it is increasingly desirable for the applications to be able to access objects belonging to other protocols that are becoming more widely used. Some of these protocols could be converted, but only with great difficulty and a certain amount of inconvenience. This is the case, for example, with computer resources wherein the data is represented in a common technological base and wherein data and services are exchanged using different protocols. One of these common technological bases is a distributed object architecture like CORBA (Common Object Request Broker Architecture), defined by the group of vendors and users working toward object management standardization, known as OMG (Object Management Group), and the Microsoft architecture OLE/COM (Object Linking and Embedding/Component Object Modeler). The CORBA architecture will be used herein as a non-limiting example. In the field of distributed computing, the CORBA architecture makes it possible to describe interfaces for computer services independently from the vendors and the languages that implement these services. The description of the interfaces is produced using a neutral interface description language known as IDL (Interface Definition Language), also defined by the group OMG. This language defines the boundaries of a component that constitutes a managed object, i.e., the contractual interfaces of the component with potential clients.

The automatic generation of an agent integrator for a CORBA distributed object architecture using IDL language currently comprises the creation of an interface description file in IDL language, and the automatic conversion and compilation of the description file. There are several known conversion algorithms, such as those published by the group JIDM (Joint Inter-Domain Management) of the group OMG. The problem with these algorithms is that the conceptual notions that can be described in the GDMO language of the CMIP protocol cannot be described in IDL language. Consequently, only some of the desired objects of the base MIB are obtained. The current solution consists of manually completing the code generated by the conversion, so as to use the characteristics of the GDMO language to best advantage. This solution has the main drawback of being time-consuming and expensive.

Another common technological base used more and more frequently is the model known as CIM (Common Information Model). This standardized model is defined by the consortium DMTF (Desktop Management Task Force). The CIM model is object-oriented and makes it possible to define conceptual schemas and real-world objects dedicated to management. It uses a unified modeling language known as UML (Unified Modeling Language). This model is currently enjoying increasing success because of its adaptation to exchanges in internet networks. Thus, it is used for enterprise management through the Web, currently known by the acronym WBEM (Web-Based Enterprise Management). In particular, the CIM model offers the dual advantage of being able to use a browser to search for management data, while using internet technologies for management. This model also offers the advantage of being well adapted to resources having a distributed object architecture.

Vendors of management systems or management system components that use a common technological base for representing objects adopt different protocols for exchanging data and services in order to meet users' various needs. For the CIM model that is used as an example, there are various existing products supplied by different vendors. Given the rising success of this model, we can expect many other different products in the near future. This would require as many agent administrators as there are products.

It is also desirable for the management to extend to other particular domains. This is particularly the case for the domain related to objects stored in directories, especially when those directories are disparate and stored in various systems that can often be incompatible with one another. This is true, for example, of the protocol LDAP (Lightweight Directory Access Protocol), which uses the TCP/IP layer as required transport for internet networks and which provides a simple protocol for accessing these directories via internet networks. These directories can contain, for example, information on organizations and individuals (names, addresses, telephone numbers), public keys and other resources. The directories can be distributed in several servers. The objects in a directory are organized into a tree. An agent integrator for converting this protocol into CMIP would not pose any problem since the two protocols are very similar. They have the creation, deletion and modification functions in common, and they make it possible to specify a filter, a request scope and a list of attributes. However, there are other protocols in the domain of objects stored in directories that are very different from the CMIP protocol and would pose big problems or be very difficult to use.

Therefore, the problem is to avoid having to access the objects of the computer system via only the CMIP protocol of the platform, in order to avoid the use of integrating agents. One solution would consist of giving the applications of the management platform direct access to objects assigned to access protocols other than CMEP, such as for example the protocols CORBA, CIM and LDAP.

Access via various protocols to objects of a hierarchical tree is currently possible, for example the access offered by the naming directory interface known as JNDI (Java Naming Directory Interface), which uses the Java® language. This interface makes it possible to access objects by naming them in a unique way. One advantage of this unique naming is that it is identical to that used by the CMIS service, which uses the GDMO description language of the CMIP protocol of the platform used as an example. The interface JNDI is therefore also easily adaptable to the LDAP protocol, which is similar to CMIP. It is capable of transparently providing a common access to all of the heterogeneous objects belonging to different domains. This common access is obtained by means of protocol layers known as SPI (Service Protocol Interface) layers, respectively assigned to the protocols of the heterogeneous target objects. In addition to the possible SPI layers assigned to respective protocols, there can be one or more SPI layers that are not assigned to a protocol, for example an SPI layer for accessing the contents of a disk in a computer. In this case, the SPI layer is assigned to an access means.

Each SPI layer represents a particular context. This context is created during an operation in the SPI layer. Thus, in order to access objects belonging to a desired protocol (CMIP, CORBA, LDAP, CIM or another protocol), the common interface JNDI asks the SDI layer corresponding to the particular protocol to create a context indicating how to access any object assigned to the protocol of the corresponding SPI layer. It is therefore necessary to know the semantics of the object in order to create the context corresponding to the management domain of the object. The interface JNDI serves as an intermediary for the user who, by designating the SPI layer he wishes to use with the aid of a management application, creates the corresponding context. Such a knowledge of the semantics of each object by an application poses a practically insurmountable problem linked to the acceptance in an application of a new protocol or a new access means. This acceptance requires a modification of the code of the application in order to provide a knowledge of the context of the objects to be manipulated. Such a solution is not possible in practice. Moreover, the objects are defined in an environment that can be highly scalable. Furthermore, for each activity domain normally assigned to a particular protocol, a different context must be created and accepted by the application.

SUMMARY OF THE INVENTION

A first object of the invention is to allow generic access to any object in a tree. Generic access to an object is access independent of the protocol that is attached to the object. In other words, generic access creates an abstraction of the means used to access the object. Within the framework of the example chosen, the access method according to the invention does not require any application to know the context of the object and does not require a modification of the code of the application.

A second object of the invention is to offer scalable generic access, the objects in the tree being variable and other protocols being able to be added or deleted without requiring any substantial modification of the existing means used to obtain generic access.

A third object of the invention consists in providing a method that can easily be used to access the objects of a heterogeneous tree, without complicating the execution of the conventional method.

A fourth object of the invention consists of obtaining generic access that is inexpensive.

The subject of the invention is a method for access via at least two protocols to objects in a tree representing at least one system resource, the method using interface means to access the objects in the tree via said protocols, characterized in that it comprises at least one cycle comprising the following steps: making a request designating a target object to be accessed in the tree and having a scope of only one level below the target object; using an access protocol attribute of the target object indicating its access protocol to allow access to the target object through interface means; and obtaining via the request a response that includes at least the naming attribute of each object contained in the scope of the request and, if at least one object contained in the scope of the request has an access protocol different from that of the target object, the access protocol attribute of this object.

A related subject of the invention is a system for managing a system resource represented by a tree of objects contained in a management information base, the management system including a generic application for managing the resource through interface means that allow access to the objects in the tree using at least two protocols, characterized in that access to objects in the tree is obtained according to the method defined above.

Another related subject of the invention is a system, such as a computer system, that includes at least one system resource represented in the form of a tree of objects, characterized in that access to objects in the tree is obtained according to said method or by means of said management system.

Yet another related subject of the invention is a computer program that is loadable into an internal memory of a computer system, characterized in that it comprises code segments for implementing said method.

Another related subject of the invention is a computer program recording medium, characterized in that it comprises a program readable by a machine of a computer system and/or in a management system for controlling the execution of said method.

DETAILED DESCRIPTION OF THE PREFERRED EMBODIMENTS OF THE INVENTION

Figure 1:
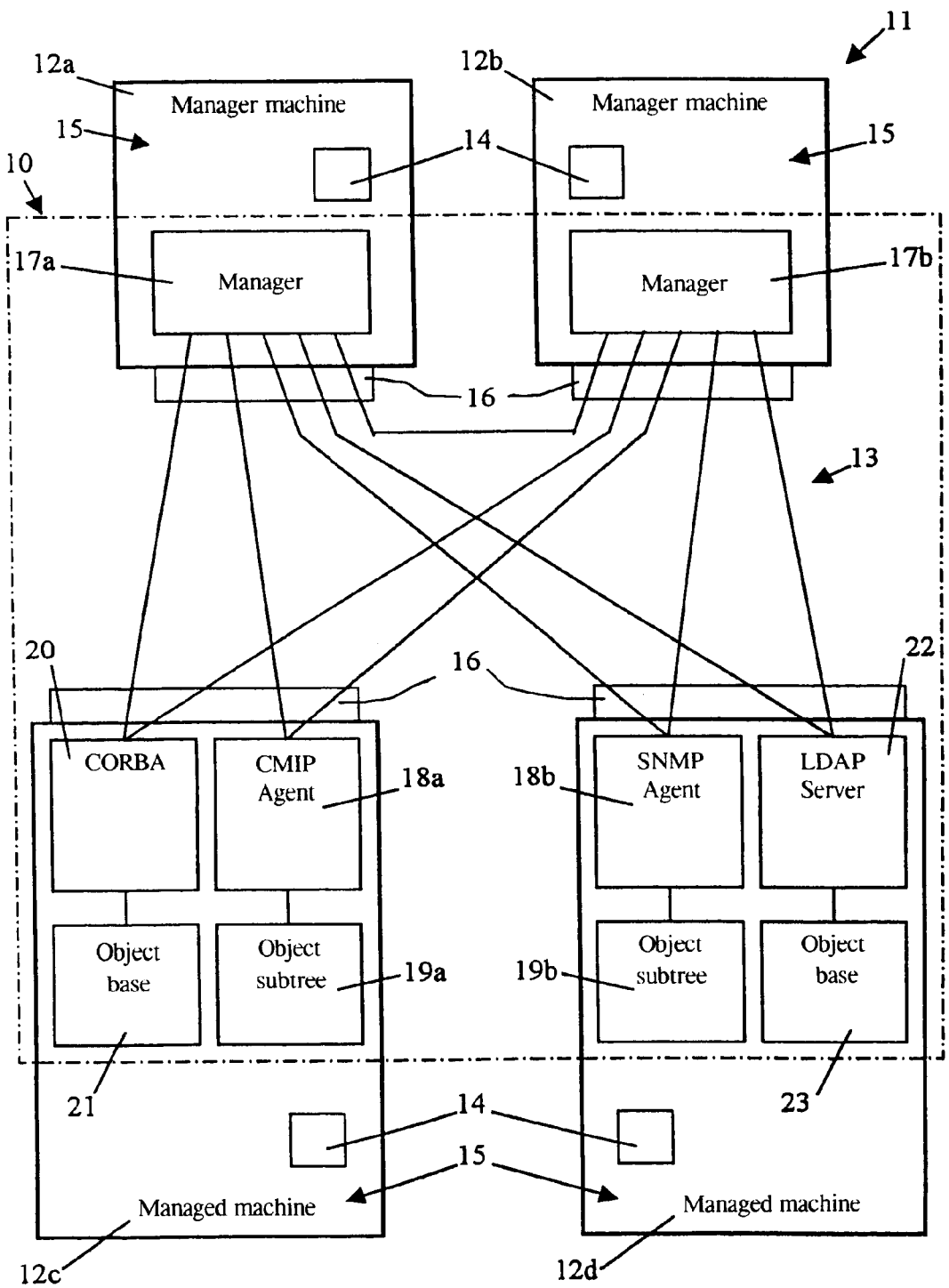
FIG. 1 is a block diagram of a management system of a computer system, the management system implementing a method for access via various protocols to objects in a tree representing at least one resource of the computer system.

FIG. 1 represents a management system 10 of a computer system 11. The following example relates to the management and security system known by the Applicant's registered trade name OpenMaster. Its design conforms to the ISO standards for network and systems management. Under these conditions, the English-language terms used will be in accordance with this standard, including the abbreviations and acronyms. In addition, the French verbs "administrer" and "gérer" and their derivatives used herein have both been translated into the English verb "manage" and its derivatives. One skilled in the art is quite familiar with these standards. Of their total informational content, only the elements required to understand the invention will be given here.

The computer system illustrated 11 is distributed and is composed of machines 12, in this case four machines 12a–12d, organized into one or more networks 13. A machine is a very broad conceptual unit that includes both hardware and software, and can be the means involved in running a given application, means for executing a given function, a computer, as well as a computer system in a cascaded-systems architecture. The machines 12 can therefore be quite diverse, such as workstations, servers, routers, specialized machines and gateways between networks. The computer system 11 is ordinarily a system comprising several processors 14, one processor 14 for example being illustrated in each machine 12, storage means 15 for containing the software and the data of the system, and input/output means 16 used for communication between machines through the network 13 by means of various protocols, as well as for one or more external communications, for example for printing, faxing, etc. Such a system can for example manage data remotely, distribute data in the case of a reservation system, control the execution of programs remotely in specialized machines, locally share physical or logical resources, and communicate. More generally, the system 11 is composed of hardware and/or software resources, real or virtual, such as machines, printers, virtual circuits, networks and applications. The management system 10 uses at least one of these resources in accordance with an object-oriented data model, the chief characteristics of which are known: classes, objects, inheritance, encapsulation, methods and events.

The management system 10 chosen has a client-server type of architecture. In the example illustrated, two managers 17a, 17b form management servers included in the machines 12a and 12b, called manager machines, while the management clients 18, 20 and 22 are included in the machines 12c and 12d, called managed machines. According to a common and advantageous option of the management system 10, a manager 17a also manages the corresponding manager machine 12a or manages all or some of the manager machines. This can be done in a way similar to that illustrated above, more or less adapted to this option. The example illustrated offers the dual advantage of facilitating the reading of the drawings while allowing one skilled in the art to generalize the system described and illustrated.

Figure 2:
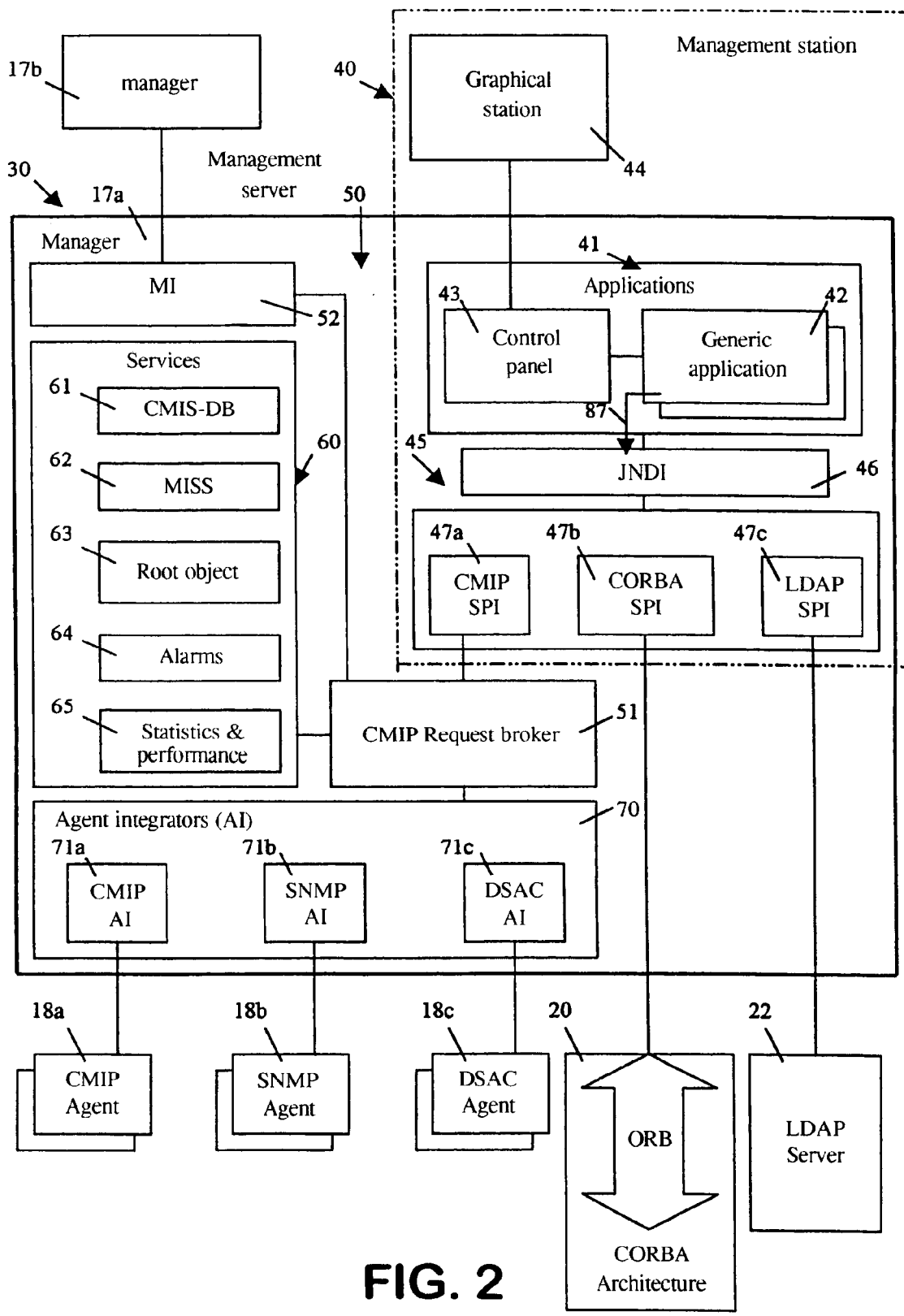
FIG. 2 is a detailed block diagram of the structure of a management platform of the management system represented in FIG. 1 and illustrating an exemplary implementation of the method.

FIG. 2 illustrates the structure of a management platform 30 of the management system 10. The platform 30 can be limited to one manager machine or can be distributed among several manager machines. For the sake of convenience, the platform illustrated in FIG. 2 will be limited to the manager machine 12a, and thus corresponds to the manager 17a. The platform 30 is composed of two units 40 and 50. The unit 40 contains a block 41 containing a set of generic applications (core applications) 42 connected to a control panel 43. The applications can be written in several languages, the language SML being the language chosen. The control panel 43 is conventional and includes a graphical part and a request launcher. A graphical station 44 outside the platform 30 makes it possible to display the applications, launch the requests and display the results contained in the responses. It allows a user to connect to the machine 12a in order to start and stop his own copies of the applications 42 as he wishes. The unit 40 comprises interface means 45 for access via various protocols to the objects of the management system 10. This interface implements the method according to the invention and will be described below. The unit 40 can form an autonomous unit delimited by a broken line and can constitute a management station.

In the case where the unit 40 constitutes a management station, the unit 50 forms a management server. The server 50 uses only one given protocol, in this case the protocol CMIP. It comprises four functional blocks: a communication block 51, also called a CMIS request broker or CMIS dispatcher; a block 52 of manager integrators MI in connection with at least one other manager, in this case the manager 17b, and/or with a supramanager; a services block 60; and a block 70 of agent integrators 71a–71c assigned to respective protocols such as CMIP, SNMP and DSAC, illustrated. The broker 51 is connected to the interface means 45 of the station 40 in order to process the requests via the CMIP protocol, to the block MI 52, to the services block 60 and to the block 70 of agent integrators. The block 60 contains all the services common to the applications 42, including: a CMIS database CMIS-DB 61; a Management Information Schema Service, or MISS, containing the schemas, also called the classes or models, of the objects managed by the platform; a service 63 for managing objects under the root ROOT to which all the managed objects are attached; an alarm service 64; and a statistics and performance service 65 used for high-performance applications 42.

Figure 3:
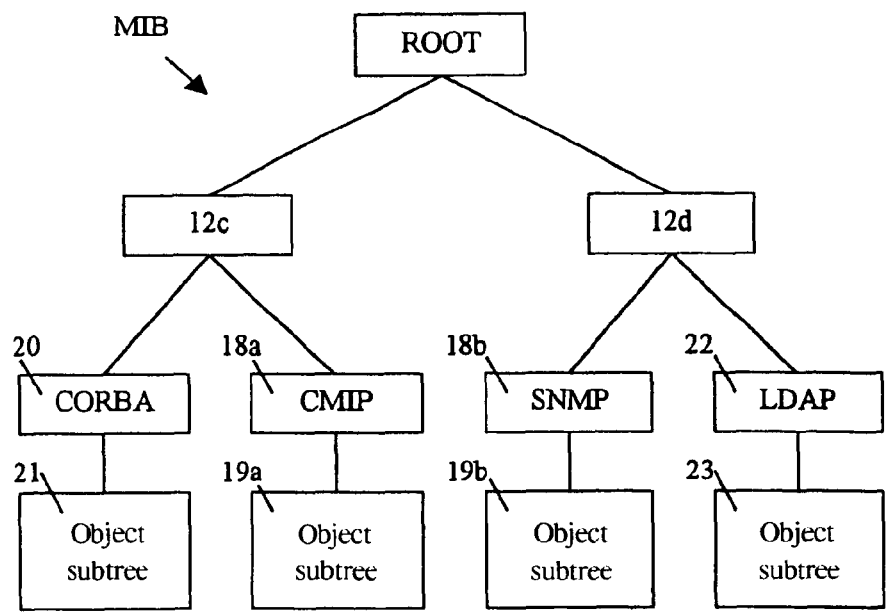
FIG. 3 is a partial, simplified schematic view of an exemplary base MIB corresponding to the computer system represented in FIG. 1.

FIG. 3 illustrates in partial, highly schematic fashion an exemplary structure of a base MIB of objects managed by the management system 10 and representing resources of the computer system 11. In the example chosen, the resource or resources of the computer system 11 are converted into object classes organized hierarchically in a management information base MEB. This base is not a database per se, but is similar to a catalogue of characteristics, since it contains the description and the content of every class managed by the management system 10.

Figure 4:
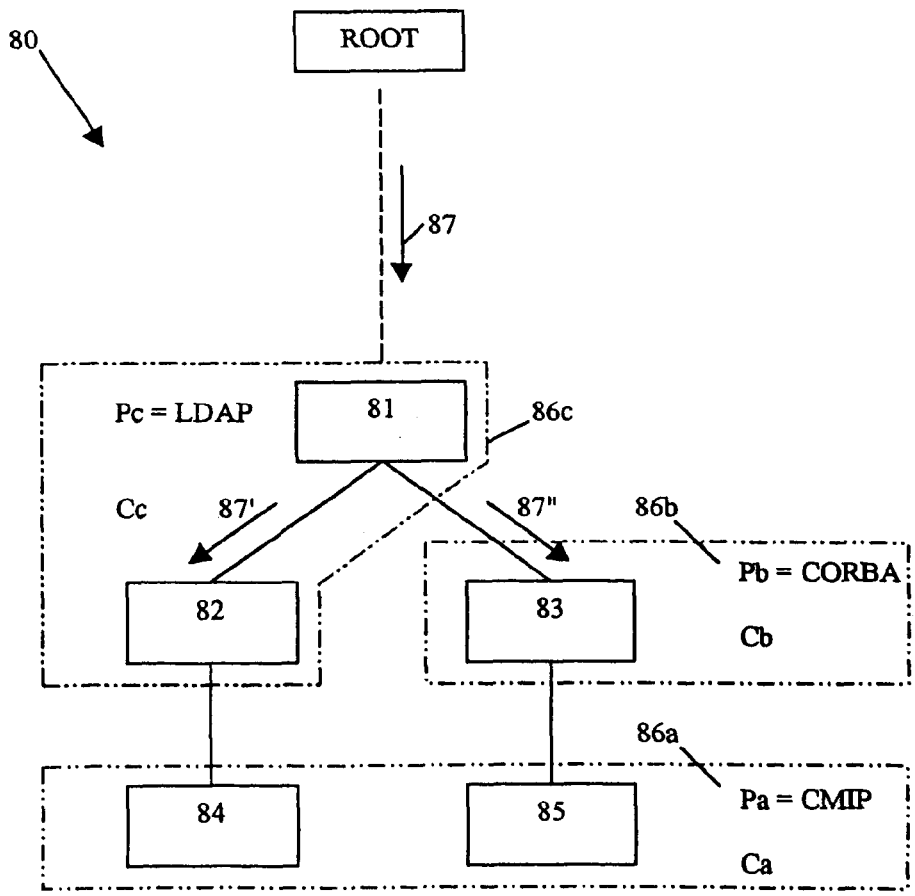
FIG. 4 is a partial schematic view of an exemplary object tree corresponding to the base MIB represented in FIG. 3, which example serves to illustrate the steps of the method for access to objects of the tree.

FIG. 4 is a partial, simplified view of a tree 80 corresponding to the base MIB. It distinguishes between the class tree, a class being defined as subordinate to one or more mother classes, and the instance tree, an instance being attached to one or more mother instances. The class tree is contained in the service MISS 62, while the instance tree is the tree 80. A class is defined by characteristics called attributes, such as a name of a component of the system and a printing status. An object of a class is called an instance of the class. A managed object is therefore an abstract view, defined for the purpose of managing a logical or physical resource of a system.

The objects in the tree can be uniquely identified using a rule for allocating a name, commonly called a naming rule, based on a hierarchical order. An instance in the base MIB has a relative distinguished name RDN in the form of a list of assertions on attribute values called AVAs (Attribute Value Assertions). Each assertion AVA is a <naming attribute> <value> pair, the naming attribute being the attribute that, in the class, allows the unique identification, in a naming space, of an instance relative to its mother instance. In a manager 17a in the example illustrated, a name RDN is composed of only one assertion AVA, hence only one <naming attribute> <value> pair. Generally, however, it is possible for a relative distinguished name RDN to have several assertions AVA. Each instance in the base MIB is uniquely identified by its distinguished name DN, which is the sequence of names RDN on the path between the root and the instance in the instance tree. A subtree of an instance corresponds to the set formed by the instance itself and the instances that are subordinate to it in the instance tree.

All the objects of the base MIB in FIG. 3 are located under the root ROOT and are distributed into MIBlets, here representing the two managed machines 12c and 12d, corresponding to two subtrees. The root ROOT is contained in the service 63 and the roots of the subtrees are called rootlets. Thus, any application 42 needing to process an object of the base MIB addresses the service 63 in order to access the object. The objects can be accessed by means of various protocols. In the example illustrated in FIGS. 1 and 2, it is possible to distinguish the objects that can be accessed by means of agents 18a and 18b and combined in respective MIBlets 19a and 19b. The agents 18a and 18b are included in the respective managed machines 12c and 12d, and in the example illustrated are assigned to the two protocols CMIP and SNMP. More generally, a machine can include several agents related to different protocols. FIG. 2 also includes agents DSAC 18c. All of the agents, for example 18a, related to the same protocol are linked to the broker 51 of the platform 30 by means of a respective integrator 71a of the block 70. Thus, the objects linked to the protocols CMIP, SNMP and DSAC can respectively be accessed through the agents CMIP 18a, SNMP 18b, and DSAC 18c, via the network 13, and the respective integrators CMIP 71a, SNMP 71b and DSAC 71c. Integrators of this type are well known.

FIGS. 1, 2 and 3 also show that the managed machine 12c also contains a CORBA architecture 20 of objects distributed into a MIBlet 21 and the managed machine 12d contains an LDAP server 22 provided with an object base 23 constituting a MIBlet. FIG. 1 is a representation that has been simplified to facilitate the description, one skilled in the art being aware that the objects in the MI Blets 21 and 23 could also be distributed to other machines of the computer system 11. Thus, objects of the MIBlet 21 could be contained in the machine 12d and objects of the MIBlet 23 could be contained in the machine 12c. Furthermore, each machine can contain several different agents, and machines can have agents of the same type. It is understood that the tree 80, which corresponds to the base MIB of FIG. 3, is in reality a tree of heterogeneous objects that can be accessed via various protocols.

FIG. 2 illustrates an exemplary structure of the interface means 45 that allow the requests sent by the applications of the platform 30 to access, via three protocols Pa, Pb and Pc, in this case the respective protocols CMIP, CORBA and LDAP, the corresponding objects of the base MIB represented schematically and summarily in FIG. 3. The interface means 45 comprise a common interface 46 for access to the objects of the tree 80 and three interface layers 47a–47c adapted to the three respective protocols CMIP, CORBA and LDAP. The three interface layers 47a–47c link the common interface 46 to the three means for managing objects via the three respective protocols, i.e., the management server 50, the CORBA architecture, and the LDAP server. In the exemplary embodiment chosen, the common interface 46 is a naming directory interface in Java® language known as JNDI, and the three layers are associated service protocol layers known by the name SPI (Service Protocol Interface), supplied by the company Sun Microsystems, Inc.

The tree 80 of FIG. 4 includes the root ROOT and a target object 8 with the LDAP. The object 81 can correspond to the LDAP server 22 in the base MIB of FIG. 3 or to an object located at a lower level under the root ROOT. The object 81 is the father of a first son 82 with the LDAP protocol and a second son 83 with the CORBA protocol. The first son 82 is itself the father of a son 84 with the CMEP protocol and the second son 83 is the father of a son 85 with the CMIP protocol. The tree 80 therefore defines three naming spaces 86a–86c illustrated by broken lines, related to the three respective protocols CMIP, CORBA and LDAP and respectively containing the objects 84–85, 83 and 81–82.

An exemplary implementation of the method for accessing objects in the tree 80 will now be described. The method comprises at least one cycle, which includes three steps. In the first step, a request 87 represented in the form of an arrow in FIGS. 2 and 4 is created in order to access an object, the target object 81 in FIG. 4, for example. In the example illustrated, the request 87 is sent by a generic application 42 to the common interface 46. The scope of the request 87 is limited to only the first level below the target object 81. An access involving the first level below the target object 81 (access scope of first level only) is defined as consisting of knowing only the son objects of the target object, in this case the objects 82 and 83. An access with a scope of two levels consists of knowing only the son and grandson objects of the target object, in this case the objects 82–85. The scope is limited to the first level below the target object due to the fact that the objects of the tree 80 have heterogeneous access protocols like the tree 80, as will be revealed below.

In the second step, the request 87 uses the common interface to access the target object 81. In order to access objects belonging to a particular protocol, in this case CMIP, CORBA or LDAP, the common interface JNDI 46 requests the creation of a context using the protocol interface layer SPI 47 corresponding to the particular protocol. In the example of FIG. 4, access to the object 81 or 82 belonging to the naming space 86c related to the LDAP protocol requires the creation of a context Cc related to the layer 47c. This context Cc gives access to the objects belonging to this protocol. Likewise, in reference to FIGS. 2 and 4, access to the object 83 belonging to the naming space 86b related to the CORBA protocol requires a context Cb related to the layer 47b and access to the objects 84 and 85 belonging to the naming space 86a related to the CMIP protocol requires a context Ca related to the layer 47a.

A context C is primarily constituted by two attributes: a construction attribute known as a "factory" and a locator attribute known as a "URL" (Uniform Resource Locator). The "URL" attribute is an address (a location, a physical machine, for example) at which the software that knows how to execute this piece of code is located. The "factory" construction attribute is the piece of code that makes it possible to access the object by creating a request 87 and to obtain the properties of the object, i.e. the values of its other attributes. The "factory" attribute specifically designates the naming space of the object, i.e. the protocol attached to the object. As a result of this attribute, the common interface 46 knows how to designate the access protocol layer. From the common interface 46, the request 87 is then sent to the interface layer 47c related to the LDAP protocol for accessing the target object 31, which is defined in the context Cc of this object. In the example illustrated in FIGS. 1 through 4, access is obtained from the root ROOT using the service 63.

In summary, the first step of the method comprises the creation of a request designating a target object to be accessed in the tree and having a scope limited to the first level below the target object. In other words, the method according to the invention makes it possible to access objects of the tree 80 and thus to navigate through the tree without taking the semantics of the objects into account, by performing the navigation by means of a request 87 having a scope limited to the first level. When it comes to accessing the target object, it must be noted that in a given naming space, it is possible to know all of the objects below a target object. Consequently, the target object 81 can be just below the root ROOT or one level below a rootlet in the same naming space as the target object. However, it is not possible to know the properties of the objects of any naming space other than that of the target object, although we know how to name them. In order to learn the properties of these objects, the second step comprises the utilization of an access protocol attribute of the target object indicating its access protocol to allow access to the target object via the common interface and the interface layer related to the access protocol of the target object. In the example chosen, the access protocol attribute is constituted by the "factory" construction attribute and additionally, the URL attribute of the context of the object whose naming space is different from that of the target object.

We know that the response to a request is a list of the objects located within the scope of the request. Each object has a certain number of attributes. The third step in the cycle of the method is for obtaining via the request a response that includes at least the naming attribute of each object located on the level or levels of the scope of the request. The naming attribute suffices as long as each object located in the scope of the request belongs to the same naming space as the target object. Access to any of the objects in the scope of the request is obtained with the same context in a second cycle. However, if at least one object included in the scope of the request belongs to another naming space, it is necessary to know at least the protocol attribute of this object in order to be able to access the object in a second cycle of the method. In the example chosen, the response also includes as an optional attribute the name of the class of the object. This third step makes it clear why the scope of the request is limited to the first level below the target object. Starting with an object, we know how to name the son objects and even the grandson objects, if all of these objects belong to the same naming space. On the other hand, if one of the son objects does not belong to the same context as the target object (father object) from which the request was generated 87, the search becomes impossible, since it is not possible to access the object and learn its properties without having its protocol attribute. It is therefore not possible to advance progressively through each level of the tree.

In the example of FIGS. 1 through 4, navigation through the tree 80 takes place in the following way. Beginning with the target object 81 of the LDAP naming space 86c, the request launched by a generic application 42 uses the layer 47c. It has a scope of only one level and provides in response the objects 82 and 83. However, the application 42 that performs this navigation through the tree does not know the protocol of the objects 82 and 83. The method makes it possible to provide a view of the objects located on the level of the scope of the request. Because on this level the father object 81 does not necessarily have the same attributes as the son objects 82 and 83 since they can belong to different classes, the response returns the naming attribute of each object in the scope. This attribute suffices if the object belongs to the same naming space as that of the target object. If at least one object belongs to another naming space, the response also returns the access protocol attribute, which in the example chosen is the "factory" attribute, and additionally and advantageously, the "URL" attribute of the context of the object.

This first cycle of the method may be enough. Otherwise, this cycle can be reiterated one or several times, using as the new target object one of the objects from the response to the request 87 of the previous cycle. For example, the new target object 82 having been chosen and belonging to the same protocol as the previous target object 81, a new request 87' will be transmitted through the common interface 46 and the same protocol interface layer 47c as for the previous request 87, and the response will include the class and the naming attribute of the object 84, as well as the "factory" access protocol attribute indicating that the object 84 belongs to the CMIP protocol. On the other hand, if the new target object is the object 83, its "factory" access protocol attribute relates to the CORBA protocol and not to the LDAP protocol of the father object 81. A new request 87" is then transmitted through the common interface 46 and the protocol interface layer 47b. The response to the request 87" includes the class and the naming attribute of the object 85, as well as the "factory" access protocol attribute indicating that the object 84 belongs to the CMIP protocol.

Navigation through the tree thus becomes generic, since it is not necessary at any level of the tree to know the semantics of the object, as in the prior art. As a result of the method of the invention, one need only verify whether or not a "factory" attribute is present in the response and analyze its content in order to know the associated context. The absence of such an attribute indicates that the object has the same context as that of the target object. It is therefore possible to use this new object as a target object while maintaining the same context and the same SPI layer as for the previous target object. If at least one access protocol attribute is present, this attribute indicates that at least one object returned in the response (in this case the object 83) belongs to a naming space other than that of the initial object 81, and that this space is defined by the "factory" attribute. Consequently, in order to be able to continue navigating through the tree via another protocol, it is necessary to change contexts in order to use the context related to this other protocol. On the other hand, it must be noted that if the application wants to know all of the attributes of any one of the objects in the tree, it must execute a request on this object itself with the context C associated with this object, and not with a request of a given scope as just described. In order to obtain the attributes of an object belonging to another context, it must execute another request whose type is determined by the access protocol attribute of this object.

The result of the implementation of the method just described is that an object (83 for example) is visible in two different ways in two different naming spaces. First of all, it is visible in the space 86c of the target object 81 through the naming attribute, and additionally through the class of this object. In fact, the object 81 being a father object, it knows some of the attributes of its sons, including the naming attribute and the class. Among the (father) target objects and the son objects, it is possible to have objects that are different in terms of semantics, i.e., not necessarily of the same class. Secondly, it is visible in the naming space 86b of the object itself 83. The space 86b makes it possible to learn all of the attributes of the object 83 using a request based on the corresponding interface layer SPI 47b, defined from the "factory"—"URL" attributes of the associated context Cb.

The method described and illustrated in reference to FIG. 4 can also be applied to a systematic access for finding objects in the tree 80 of FIG. 4 starting at the root ROOT. In the example described, it is applied to a navigation performed starting at the root ROOT in order to access a target object in the tree 80.

Many other variants could be added by anyone skilled in the art upon reading the example chosen. In particular, it should be clear from the example chosen that the common interface 46 requests the creation of a context using the protocol interface layer 47 corresponding to the particular protocol and that the access protocol attribute is consequently chosen as at least the "factory" construction attribute of the context. However, it is generally clear from the preceding description that, in general, the access protocol attribute could be different from an attribute of the context for other interface means 45.

An embodiment of the example illustrated has been produced and comprises the four files presented in the annex that follows. They were created by the Applicant and are protected by copyright. The four files are:

DynamicTreeNode: this file makes it possible to build a hierarchical tree from the "Swing" API (supplied by Sun). For each of the nodes of the tree, a request is generated through the common interface JNDI in order to find all the son objects of the corresponding node. For each of the responses, the list of attributes returned is analyzed to see if the "factory" attribute is present. If that is the case, a new context is created with a new "factory" attribute, otherwise the same context as that of the father object, i.e. the object from which the request was generated, is used;

MargueriteToolKit: this file contains static data used to build the tree;

JndiRequest: this file makes it possible to generate a pool of contexts in the shared mode; and SampleData: this file contains the description of a node of the tree. It is from this description that a JNDI request 87 can be created.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

ANNEX

```
/* ============================== */
/* File: DynamicTreeNode.java */
/* ============================== */
/*
Exemplary use of the "factory" attribute in the response to a JNDI request
For a given node of the tree, the latter (an object SampleData) is associated with:
- a name (which makes it possible to name it in a unique way)
- the base object (concatenation of the names of the superior objects)
- a factory attribute that gives the means for accessing the object
- an address (or url) that makes it possible to initialize the context associated with the
factory attribute
Sequence:

1. Generation of a search request with the following arguments:
 - base object
 - scope: first level only
 - filter: objectclass = * (in fact, all of the objects located under it)
2. Analysis of the result
 This request returns a result that is enough to analyze. A search is performed to see
whether or not the factory attribute is present in the list of attributes returned.
 - If the attribute is present, the context must be changed
 - If the attribute is not present, the same context is maintained
*/
package Marguerite.Java.Jndi.Client;
```

ANNEX-continued

```
import javax.swing.tree.DefaultMutableTreeNode;
import java.awt.Color;
import java.awt.Font;
import java.awt.Toolkit;
import java.util.Random;
import javax.naming.*;
import javax.naming.directory.*;
import java.util.*;
import javax.naming.spi.InitialContextFactory;
import java.util.Enumeration;
import Marguerite.Java.Jndi.Util.*;
public class DynamicTreeNode extends DefaultMutableTreeNode {
    /* Formatting stuff */
    SampleSchema theSchema = new SampleSchema( );
    /** Have the children of this node been loaded yet? */
    protected boolean hasLoaded;
    protected boolean ableToChangeFilter;
    /**
     * Constructs a new DynamicTreeNode instance with o as the user
     * object.
     */
    public DynamicTreeNode(Object o) {
        super(o);
    }
    public boolean isLeaf( ) {
        return false;
    }
    public boolean getAbleToChangeFilter( ) {
        return(ableToChangeFilter);
    } /* getAbleToChangeFilter */
    /**
     * If hasLoaded is false, this means the children have not yet been
     * loaded, loadChildren is messaged and super is messaged for
     * the return value.
     */
    public int getChildCount( ) {
        if(!hasLoaded) {
            loadChildren( );
        }
        return super.getChildCount( );
    }
    /**
     * We have to show all the children of this node.
     */
    protected void loadChildren( ) {
        DynamicTreeNode   newNode, fatherNode;
        Font           font;
        int            randomIndex;
        SampleData        data;
        SampleData userObject = (SampleData) getUserObject( );
        int counter = 0;
        try {
            if (userObject.getType( ) ==
MargueriteToolKit.MARGUERITE_TYPE_OF_NODE_SCHEMA) {
                ableToChangeFilter = true;
                /* Display all the subordinates classes */
                Vector v = theSchema.getSubordinates(userObject.getObjectClass( ));
                for (Enumeration e = v.elements( ); e.hasMoreElements( );) {
                    Vector w = (Vector) e.nextElement( );
                    String s = (String) w.elementAt(1);
                    newNode = new DynamicTreeNode(new SampleData(s,
                                       userObject.getFactory( ),
                                       userObject.getUrl( ),
MargueriteToolKit.MARGUERITE_TYPE_OF_NODE_OBJECT,
                                       s,
                                       userObject.getBase( ),
SearchControls.ONELEVEL_SCOPE,
                                       "(" +
MargueriteToolKit.getLdapObjectClassAttribute( ) + "=" + s + ")"));
                    insert(newNode, counter);
                    counter++;
                } /* for e */
                hasLoaded = true;
            } else {
                /* Send a JNDI request in order to retrieve all the objects under this one */
                NamingEnumeration results = userObject.sendRequest( );
                /* Check the result of the search */
                int nbRequest = 0;
                ableToChangeFilter = false;
```

ANNEX-continued

```
                if (!results.hasMore( )) {
                   hasLoaded = true;
                   System.out.println("Nothing found.");
                } else {
                   /* For each entry found. */
                   while (results.hasMore( )) {
                      SearchResult sr = (SearchResult) results.next( );
                      Attributes attrs = sr.getAttributes( );
                      String theNodeName;
                      if (attrs == null) {
                         System out.println("No attributes");
                      } else {
                         nbRequest++;
                         String url=null, factory=null, newBase=null, objectClass=null;
                         /* factoryContext is the attribute to set if we want to change the
naming context */
                         Attribute factoryContext = (Attribute)
attrs.get(MargueriteToolKit.MARGUERITE_FACTORY_CONTEXT_ATTRIBUTEID);
                         Attribute urlContext = (Attribute)
attrs.get(MargueriteToolKit.MARGUERITE_FACTORY_URL_ATTRIBUTEID);
                         Attribute objectClassContext = (Attribute)
attrs.get(MargueriteToolKit.getLdapObjectClassAttribute( ));
                         if (urlContext == null) url = userObject.getUrl( );
                         else url = urlContext.get( ).toString( );
                         if (objectClassContext == null) {
                            objectClass = "objectclass=*";
                            theNodeName = sr.getName( );
                         }
                         else {
                            try {
                               objectClass = (String) objectClassContext.get( );
                               String namingAttributeId =
theSchema.getNamingTemplate(objectClass);
                               Attribute namingValue = (Attribute)
attrs.get(namingAttributeId);
                               if (namingValue == null) theNodeName = sr.getName( );
                               else theNodeName = new String(namingAttributeId + "=" +
(String) namingValue.get( ));
                            } catch (Exception e) { theNodeName = sr.getName( );}
                         }
                         /* Do we have a new naming context? */
                         if (factoryContext == null) {
                            /* Take the same naming method */
                            factory = userObject.getFactory( );
                            /* Append the father */
                            newBase = new String(theNodeName + "," +
userObject.getBase( ));
                         }
                         else {
                            /* Change the naming space. So we have to change the base for
the new naming method */
                            /* We assume that the root of the new naming begins with the
last 'rdn' */
                            factory = factoryContext.get( ).toString( );
                            // newBase = sr.getName( );
                            newBase = theNodeName;
                         }
                         newNode = new DynamicTreeNode(new
SampleData(theNodeName, // sr.getName( ),
                                                       factory,
                                                       url,
MargueriteToolKit.MARGUERITE_TYPE_OF_NODE_SCHEMA,
                                                       objectClass,
                                                       newBase,
SearchControls.ONELEVEL_SCOPE,
                                                       "(" +
MargueriteToolKit.getLdapObjectClassAttribute( ) + "=" + objectClass + ")"));
                         //                    fatherNode.insert(newNode, counter);
                         insert(newNode, counter);
                         counter++;
                      } /* else */
                   } /* while */
                   hasLoaded = true;
                } /* if */
             }
          } catch (NamingException e) {
             hasLoaded = true;
             System.out.println + e.getMessage( ));
             e.printStackTrace( );
```

ANNEX-continued

```
        }
    } /* loadChildren */
}
/* ============================= */
/* File: MargueriteToolKit.java */
/* ============================= */
/*
File containing useful objects. For example, it gives the starting object (by default), the
LDAP server to contact, the method for accessing the properties of the object (factory) and its
address (url)
*/
package Marguerite.Java.Jndi.Util;
import java.util.*;
importjava.io.*;
public class MargueriteToolKit {
    public static final String NOT_AVAILABLE = "notAvailable";
    public static final String LDAP_SPI_FACTORY = "com.sun.jndi.ldap.LdapCtxFactory";
    public static final String PROPERTY_FILE = "f:\\Work\\Marguerite\\properties.browser";
    public static final String MISS_SPI_FACTORY =
"Marguerite.Java.Jndi.SPI.Miss.CtxFactoryMissJava";
    public static final String MISS_SPI_URL = "beamish";
    public static final String MISS_SOW_URL = "java.wrapper.miss.provider.url";
    public static final String MISS_SOW_FACTORY = "java.wrapper.miss.provider.name";
    public static final String CMIS_OVER_JAVA_SPI_FACTORY =
"Marguerite.Java.Jndi.SPI.Cmis.CtxFactoryCmisOverJava";
    public static final String MARGUERITE_BASE = "o=Marguerite";
    public static final String LDAP_OBJECT_CLASS_ATTRIBUTE =
"marguerite.ldap.objectclass.attribute";
    public static final String MARGUERITE_SITE_ATTRIBUTEID = "margueriteSiteId";
    public static final String MARGUERITE_DEFAULT_NAME_FOR_OBJECT_CLASS =
"objectclass";
    public static final String MARGUERITE_CMIS_OBJECT_CLASS = "objectclass";
    public static final String MARGUERITE_CMIS_OBJECT_INSTANCE =
"objectInstance";
    public static final String MARGUERITE_CMIS_OBJECT_ATTRIBUTE_LIST =
"attributeList";
    public static final String MARGUERITE_DOMAIN_OBJECTCLASS =
"margueriteDomain";
    public static final String MARGUERITE_DOMAIN_ATTRIBUTEID =
"margueriteDomainId";
    public static final String MARGUERITE_SUBDOMAIN_ATTRIBUTEID =
"margueriteSubDomainId";
    public static final String MARGUERITE_SUBDOMAIN_OBJECTCLASS =
"margueriteSubDomain";
    public static final String MARGUERITE_DEVICE_ATTRIBUTEID =
"margueriteDeviceId";
    public static final String MARGUERITE_DEVICE_OBJECTCLASS =
"margueriteDevice";
    public static final String MARGUERITE_FACTORY_CONTEXT_ATTRIBUTEID =
"margueriteFactoryAccessTypeContext";
    public static final String MARGUERITE_FACTORY_URL_ATTRIBUTEID =
"margueriteFactoryAddress";
    public static final String MARGUERITE_RELATIVE_TO_BASE_ATTRIBUTEID =
"margueriteRelativeToBase";
    public static final String MARGUERITE_REAL_OBJECT_CLASS_ATTRIBUTED =
"margueriteRealObjectClass";
    public static final String MARGUERITE_NAMING_ATTRIBUTE_ATTRIBUTEID =
"margueriteNamingAttribute";
    public static final String MARGUERITE_MISS_OBJECTCLASS_STR =
"objectClassStr";
    public static final String MARGUERITE_MISS_OBJECTCLASS_OID =
"objectClassOID";
    public static final String MARGUERITE_MISS_INSTANCE_STR = "instanceStr";
    public static final String MARGUERITE_MISS_INSTANCE_OID = "instanceOID";
    public static final String MARGUERITE_MISS_NAMING_ATTRIBUTE_STR =
"namingAttributeStr";
    public static final String MARGUERITE_MISS_NAMING_ATTRIBUTE_OID =
"namingAttributeOID";
    public static final String MARGUERITE_MISS_NAMING_BINDING_STR =
"nameBindingStr";
    public static final String MARGUERITE_MISS_NAMING_BINDING_OID =
"nameBindingOID";
    public static final int MARGUERITE_TYPE_OF_NODE_SCHEMA = 0;
    public static final int MARGUERITE_TYPE_OF_NODE_OBJECT = 1;
    public static final String MARGUERITE_EVENT_SELECTOR_INSTANCE =
"eventSelectorObjectInstance";
    private static Properties env = new Properties( );
    private static String theClassAttribute;
    private static String url;
```

ANNEX-continued

```
    private static String factory;
    public static void initEnv( ) {
      try {
         FileInputStream f = new FileInputStream(PROPERTY_FILE);
         env.load(f);
         f.close( );
         theClassAttribute = new
String(env.getProperty(LDAP_OBJECT_CLASS_ATTRIBUTE, "objectclass"));
         factory = new String(env.getProperty("java.naming.factory.initial",
"com.sun.jndi.ldap.LdapCtxFactory"));
         url = new String(env.getProperty("java.naming.provider.url",
"ldap://guiness.frcl.bull.fr:389"));
         System.out.println("\n=== Env=");
         Enumeration ap = env.propertyNames( );
         Enumeration av = env.elements( );
         for (; ap.hasMoreElements( );) {
              System.out.println(ap.nextElement( ).toString( ) + "=" +
av.nextElement( ).toString( ));
         } /* for ae */
         System.out.println("\n");
       } catch (Exception e) { }
    } /* initEnv */
    public static String getLdapObjectClassAttribute( ) {
       return(theClassAttribute);
    } /* getLdapObjectClassAttribute */
    public static Properties getEnv( ) {
       return(env);
    } /* getEnv */
    public static String getUrl( ) {
       return(url);
    } /* getUrl */
    public static Vector getAlarmFieldId( ) {
       String fieldId = env.getProperty("Marguerite.Java.Jndi.SPI.Cmis.AlarmFieldId");
       System.out.println("\nAlarmFieldId=" + fieldId);
       StringTokenizer token = new StringTokenizer(fieldId, ",");
       int nbToken = token.countTokens( );
       Vector toto = new Vector( );
       for (int i=0; i<nbToken; i++) {
          toto.addElement((token.nextToken( )).trim( ));
       } /* for */
       return new Vector(toto);
    } /* getAlarmFieldId */
    public static String getFactory( ) {
       return(factory);
    } /* getFactory */
}
/* ============================ */
/* File: JndiRequest.java */
/* ============================ */
/*
 Makes it possible to generate a JNDI request and to return the result.
 Given a url, a factory attribute, a base object, a scope and a filter, a JNDI search request is
constructed and the result is returned
*/
package Marguerite.Java.Jndi.Util;
import javax.naming.*;
import javax.naming.directory.*;
import javax.naming.event.*;
import java.util.*;
import javax.naming.spi.InitialContextFactory;
import java.util.Enumeration;
import java.awt.*;
import ism.SOW.*;
public final class JndiRequest {
    static private Vector theList = new Vector( );
    static private int nbElement = 0;
    /**
     * This method makes it possible to define a new DirContext, given a specific
environment.
     *
     * @param p The properties associated with this context
     * @exception NamingException
     * <pre>
     * <b>Example</b>
     * <code>DirContext theContext;
     * Properties env = MargueriteToolKit.getEnv( );
     * JndiRequest req = new JndiRequest( );
     * theContext = req.getContext(env);</code>
     *
```

ANNEX-continued

```
    * </pre>
    */
    public DirContext getContext(Properties env) throws NamingException {
        String url_p = (String) env.get(Context.PROVIDER_URL);
        String factory_p = (String) env.get(Context.INITIAL_CONTEXT_FACTORY);
        System.out.println("\nLooking for context.\nUrl=" + url_p + "\nFactory=" +
factory_p);
            for (Enumeration e=theList.elements( ); e.hasMoreElements( );) {
                OneContext o = (OneContext) e.nextElement( );
                if (o.isCreated(url_p, factory_p) == true) return((DirContext) o.getContext( ));
            } /* for */
        // env.put("com.sun.jndi.ldap.trace.ber", System.out);
        DirContext newContext = new InitialDirContext(env);
        System.out.println("\nCreating new context.\nUrl=" + url_p + "\nFactory=" +
factory_p);
        addContext(new OneContext(url_p, factory_p, newContext));
        return(newContext);
    } /* getContext */
    public ProxyClient getSOWClient(Properties env) throws NamingException {
        String url_p = (String) env.get(MargueriteToolKit.MISS_SOW_URL);
        String factory_p = (String) env.get(MargueriteToolKit.MISS_SOW_FACTORY);
        for (Enumeration e=theList.elements( ); e.hasMoreElements( );) {
            OneContext o = (OneContext) e.nextElement( );
            if (o.isCreated(url_p, factory_p) == true) return((ProxyClient) o.getContext( ));
        } /* for */
        try {
            ProxyClient newClient = new ProxyClient(url_p, factory_p);
            OneContext newOne = new OneContext(url_p, factory_p, newClient);
            addContext(newOne);
            HandleSowError sowErrorHandler = new HandleSowError(newOne);
            newClient.addDOWListener(sowErrorHandler);
            newOne.setErrorHandler(sowErrorHandler);
            System.out.println("\nCreating SOW context.\nUrl=" = url_p + "\nFactory=" +
factory_p);
            return(newClient);
        } catch (Exception e) {
            throw new NamingException("Cannot create " + factory_p + "proxy client on " +
url_p);
        }
    } /* getSOWClient */
    private void addContext(Object o) {
        theList.addElement(o);
        nbElement++;
    } /* addContext */
    public void removeContext(OneContext i_p) {
        String url_p = i_p.getUrl( );
        String factory_p = i_p.getFactory( );
        System.out.println("Try to remove url=" + url_p + "Factory=" + factory_p);
        for (Enumeration e=theList.elements( ); e.hasMoreElements( );) {
            OneContext o = (OneContext) e.nextElement( );
            if (o.isCreated(url_p, factory_p) == true) {
                System.out.println("\nRemoving Context. url=" + url_p + "Factory=" +
factory_p);
                /* First close connection */
                (o.getErrorHandler( )).handleDisconnect( );
                theList.removeElement(o);
                return;
            } /* if */
        } /* for */
    } /* removeContext */
} /* class JndiRequest */
/* =========================== */
/* File: SampleData.java */
/* =========================== */
/*
Makes it possible to generate a JNDI request (SendRequest) and to return the result.
Given a url, a factory attribute, a base object, a scope and a filter, a JNDI search request is
constructed and the result is returned
- a name (which makes it possible to name it in a unique way)
- the base object (concatenation of the names of the superior objects)
- a factory attribute that gives the means for accessing the object
- an address (or url) that makes it possible to initialize the context associated with the
factory attribute
- scope: first level only
- filtre: objectclass=*
*/
package Marguerite.Java.Jndi.Client;
import javax.naming.*;
import javax.naming.directory.*;
```

ANNEX-continued

```java
import java.util.*;
import javax.naming.spi.InitialContextFactory;
import java.util.Enumeration;
import java.awt.Color;
import java.awt.Font;
import java.io.*;
import Marguerite.Java.Jndi.Util.*;
public class SampleData extends Object {
    protected String factory;
    protected String url;
    protected int type;
    protected String objectClass;
    protected String base;
    protected int scope;
    protected String filter;
    protected DirContext theContext;
    public NamingEnumeration sendRequest( ) throws NamingException {
        try {
            SearchControls constraints = new SearchControls( );
            getDirContext( );
            constraints.setSearchScope(scope);
            //    System.out.println("\nsendRequest with factory="+factory+" and url="+url+" Base="+base+" Filter="+filter);
            return(theContext.search(base, filter, constraints));
        } catch (Exception e) {
            System.out.println("\nsendRequest Failed.");
            e.printStackTrace( );
            throw new NamingException(e.getMessage( ));
        }
    } /* sendRequest */
    public String getBase( ) {
        return(base);
    } /* getBase */
    public String getFactory( ) {
        return(factory);
    }
    public DirContext getDirContext( ) throws NamingException {
        try {
            if (theContext == (DirContext) null) {
                JndiRequest req = new JndiRequest( );
                Properties env = MargueriteToolKit.getEnv( );
                /* Overwrite the factory - url Properties */
                env.put(Context.INITIAL_CONTEXT_FACTORY, factory);
                env.put(Context.PROVIDER_URL, url);
                theContext = req.getContext(env);
            }
            return(theContext);
        } catch (Exception e) {
            e.printStackTrace( );
            throw new NamingException(e.getMessage( ));
        }
    } /* getDirContext */
    public String getUrl( ) {
        return(url);
    }
    public String getFilter( ) {
        return(filter);
    }
    public void setFilter(String filter_p) {
        filter = filter_p;
    }
    public int getScope( ) {
        return(scope);
    }
    public void setScope(int scope_p) {
        scope = scope_p;
    }
    public int getType( ) {
        return(type);
    }
    public String getObjectClass( ) {
        return(objectClass);
    }
    public SampleData(String name, String factory_p, String url_p, int type_p, String objectClass_p, String base_p, int scope_p, String filter_p) {
        string = name;
        factory = factory_p;
        url = url_p;
        type = type_p;
```

ANNEX-continued

```
        objectClass = objectClass_p;
        base = base_p;
        scope = scope_p;
        filter = filter_p;
        theContext = (DirContext) null;
    } /* SampleData */
}
```

What is claimed is:

1. A method for access to objects in a tree (80) representing at least one system resource (11), said method using at least two protocols (Pa, Pb, Pc) and an interface (45) to access the objects in the tree via said protocols, characterized in that the method comprises at least one cycle comprising the following steps: making a request (87) designating a target object (81) to be accessed in the tree and having a scope of only one level below the target object; using an access protocol attribute (factory) of the target object (81) indicating an access protocol (Pc) of the target object to allow access to the target object via said interface; and obtaining via the request (87) a response, said response including at least a naming attribute of each object (82, 83) contained in the scope of the request, and, if at least one object contained in the scope of the request has an access protocol different from that of the target object, the access protocol attribute of this object.

2. A method according to claim 1, wherein the access protocol attribute is a construction attribute (factory) of a context (Cc) of the target object (81).

3. A method according to claim 2, characterized in that the access protocol attribute is the context (Cc) of the target object, formed by a construction attribute (factory) and a locator attribute (URL).

4. A method according to claim 2, further comprising reiterating said cycle at least one time, and using as a new target object one of the objects (82, 83) of the response to the request (87) in a previous cycle.

5. A method according to claim 1, characterized in that the access protocol attribute is the context (Cc) of the target object, formed by a construction attribute (factory) and a locator attribute (URL).

6. A method according to claim 5, further comprising reiterating said cycle at least one time, and using as a new target object one of the objects (82, 83) of the response to the request (87) in a previous cycle.

7. A method according to claim 1, further comprising reiterating said cycle at least one time, and using as a new target object one of the objects (82, 83) of the response to the request (87) in a previous cycle.

8. A management system (10) for managing at least one system resource (11) represented by a tree (80) of objects (81–85) contained in a management information base (MIB), comprising a generic application (42) for managing the system resource through an interface (45), the interface allowing access to the objects of the tree via at least two protocols (Pa, Pb, Pc) and at least one cycle comprising the following steps: making a request (87) designating a target object (81) to be accessed in the tree and having a scope of only one level below the target object; using an access protocol attribute (factory) of the target object (81) indicating an access protocol (Pc) of the target object to allow access to the target object via said interface; and obtaining via the request (87) a response, said response including at least a naming attribute of each object (82, 83) contained in the scope of the request, and, if at least one object contained in the scope of the request has an access protocol different from that of the target object, the access protocol attribute of this object.

9. A system (10) as set forth in claim 8 wherein the access protocol attribute is a construction attribute (factory) of a context (Cc) of the target object.

10. A system according to claim 9 wherein the interface (45) is common to said protocol, and attached to interface layers (47a–47c) respectively adapted to at least said tree.

11. A system according to claim 10, characterized in that the common interface (46) is a naming directory interface in Java® language (JNDI) and the interface layers (47a–47c) are service protocol layers (SPI).

12. A system (10) as set forth in claim 8 wherein the access protocol attribute is the context (Cc) of the target object.

13. A system (10) according to claim 8 for managing at least one system resource represented by a construction attribute (factory) and a locator attribute URL.

14. A system (10) according to claim 8, further comprising reiterating said cycle at least one time and using as a new target object, one of the objects (82, 83) of the response to the request in a previous cycle.

15. A system according to claim 8, characterized in that the interface (45) is common to said protocols and attached to interface layers (47a–47c) respectively adapted to at least said two protocols.

16. A system according to claim 15, characterized in that the common interface (46) is a naming directory interface in Java® language (JNDI) and the interface layers (47a–47c) are service protocol layers (SPI).

17. A computer program adapted to be loaded into an internal memory (15) of a computer system (11), comprising code segments for access to objects in a tree (80) representing at least one system resource (11), at least two protocols (Pa, Pb, Pc) and an interface (45) to access the objects in the tree via said protocols, at least one cycle comprising the following steps: making a request (87) designating a target object (81) to be accessed in the tree and having a scope of only one level below the target object; using an access protocol attribute (factory) of the target object (81) indicating an access protocol (Pc) of the target object to allow access to the target object via said interface; and obtaining via the request (87) a response, said response including at least a naming attribute of each object (82, 83) contained in the scope of the request, and, if at least one object contained in the scope of the request has an access protocol different from that of the target object, the access protocol attribute of this object.

18. A computer program as set forth in claim 17 wherein an access protocol attribute is a construction attribute (factory) of a context (Cc) of the target object (81).

19. A computer program as set forth in claim 18 wherein the access protocol attribute is the context (Cc) of the target object, formed by a construction attribute (factory) and a locator attribute (URL).

20. A computer program recording medium, comprising a program readable by a machine (12) of a computer system

(11) for controlling the execution of a method for access to objects in a tree via said protocols, at least one cycle comprising the following steps: making a request (87) designating a target object (81) to be accessed in the tree and having a scope of only one level below the target object; using an access protocol attribute (factory) of the target object (81) indicating an access protocol (Pc) of the target object to allow access to the target object via said interface; and obtaining via the request (87) a response, said response including at least a naming attribute of each object (82, 83) contained in the scope of the request, and, if at least one object contained in the scope of the request has an access protocol different from that of the target object, the access protocol attribute of this object.

21. A computer program recording medium as set forth in claim 20 wherein the access protocol attribute is a construction attribute (factory) and a locator attribute.

22. A computer program recording medium as set forth in claim 21 characterized in that the access protocol attribute is the context (Cc) of the target object, formed by a construction attribute (factory) and a locator attribute (URL).

23. A computer program recording medium as set forth in claim 22 characterized in that the interface (45) is common to said protocols and attached to interface layers (47a–47c) respectively adapted to at least said two protocols.

* * * * *

UNITED STATES PATENT AND TRADEMARK OFFICE
CERTIFICATE OF CORRECTION

PATENT NO. : 6,654,759 B1
DATED : November 25, 2003
INVENTOR(S) : Brunet, Alain, Marian, Philippe and Grignac, Alain It is certified that error appears in the above-identified patent and that said Letters Patent is hereby corrected as shown below:

Column 25,
Line 32, "A method according to claim 1,..." should read -- A method according to claim 2, ... --

Signed and Sealed this

Seventh Day of September, 2004

JON W. DUDAS
*Director of the United States Patent and Trademark Office*